April 28, 1953    F. A. McDERMOTT    2,636,299
EMBLEM OR THE LIKE HOLDER ATTACHMENT
FOR AUTOMOBILE LICENSE PLATES
Filed Dec. 11, 1950
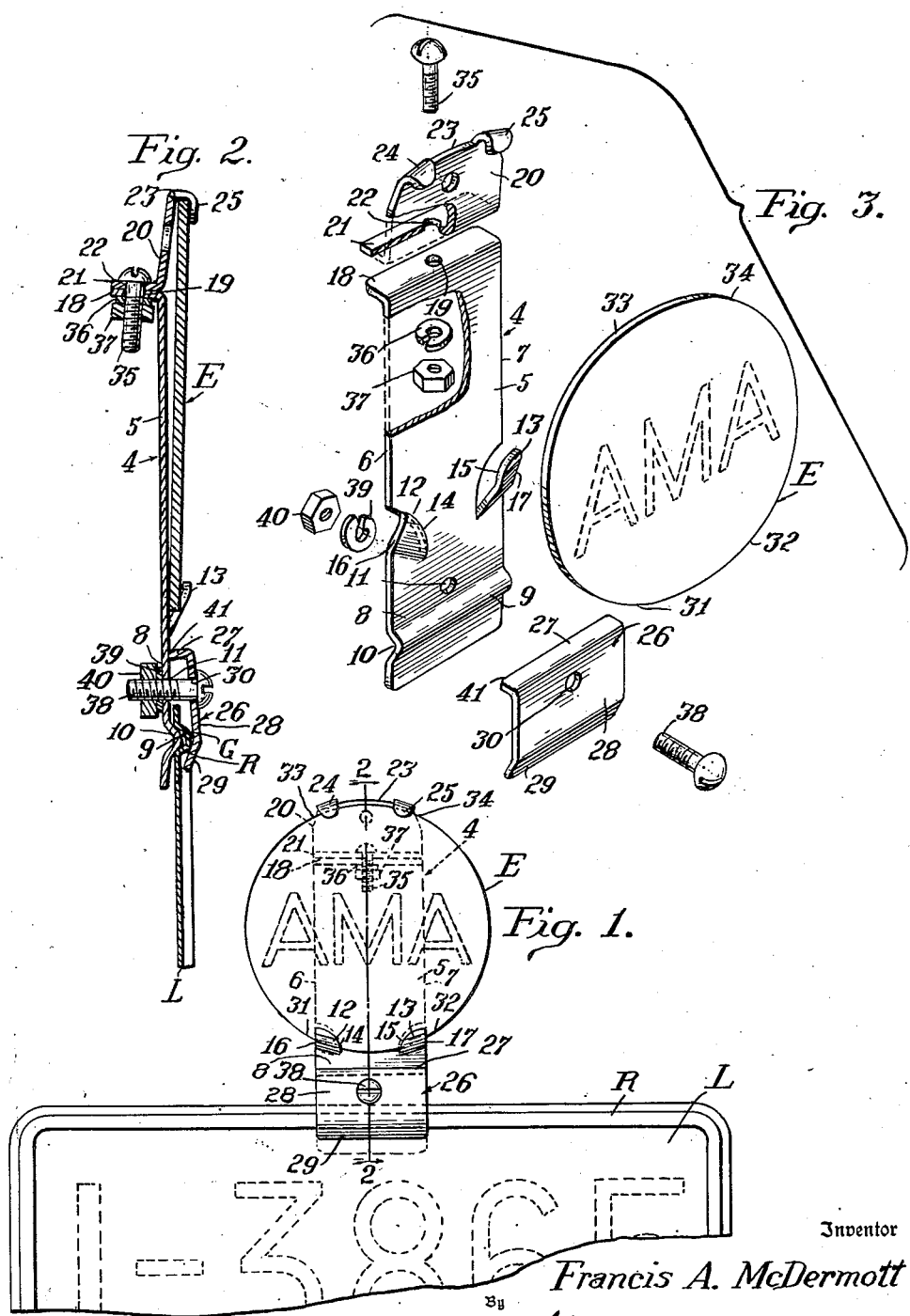
Inventor
Francis A. McDermott
By Shoemaker & Mattare
Attorneys Patented Apr. 28, 1953

2,636,299

UNITED STATES PATENT OFFICE 2,636,299

EMBLEM OR THE LIKE HOLDER ATTACHMENT FOR AUTOMOBILE LICENSE PLATES

Francis A. McDermott, Rochester, N. Y., assignor to Bastian Bros. Co., Rochester, N. Y., a corporation of New York Application December 11, 1950, Serial No. 200,189

3 Claims. (Cl. 40—125)

1

This invention relates to an emblem or the like holder attachment for automobile license plates.

In the present invention, the holder for the emblem embodies suitable clamping or holding means in connection therewith whereby the emblem is firmly held in its proper position and prevented from turning or twisting and this holder is also provided with a very simple additional clamping means by which the holder with the emblem secured thereto may be readily attached to a standard license plate of an automobile and this can be accomplished by an inexperienced person in that all that is required is that a couple of bolts be tightened.

In the emblems of the prior art, and when the same are attached to a license plate, usually some part of the license plate is obscured and this is objectionable, whereas, in the emblem holder in the present invention, no essential part of the license plate to which the holder is attached is obscured in any manner whatsoever.

In view of the foregoing, therefore, it is an object of the present invention to provide a simple and inexpensive emblem holder attachment for automobile license plates which consists of a minimum number of parts and which holder has the emblem secured thereto and may be readily secured to the license plate or the like.

Another object of the invention is to provide an emblem holder wherein the emblem that is secured thereto is prevented from turning or twisting and will be at all times maintained in its proper position for visibility and the emblem is totally devoid of any studs or other attaching means whatsoever.

Another object of the invention is to provide an emblem or the like holder that is fabricated of metal and which, when the emblem is clamped thereon, is an extremely rigid structure and which may be readily connected with a conventional license plate preferably at one edge thereof without obscuring any of the essential portions of the license plate.

Another object of the invention is to provide a substantially rectangularly shaped emblem or the like holder attachment for automobile license plates fabricated from metal and consisting of two parts which are readily brought together by a simple nut and bolt to effect firm clamping of the emblem and so as to properly visibly display the emblem and prevent it from turning or twisting and the holder being such that it may be readily attached to an edge portion of a conventional automobile license plate.

Another object of the invention is to provide

2 an emblem holder attachment for license plates which includes two clamping means, one of which clamping means is for the emblem or the like and the other for attaching the holder to the automobile license plate.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a front elevational view of the holder attached to an automobile license plate with part of the latter broken away and part of the holder shown in dotted lines;

Fig. 2 is a vertical sectional view taken substantially along the lines 2—2 of Fig. 1; and Fig. 3 is an exploded perspective view of the holder and showing all of the component and cooperative elements comprising the same.

The invention will be more readily understood by referring to the drawings in detail wherein the emblem or the like holder is denoted generally at 4. This holder in its overall outline is substantially rectangularly shaped and consists of a main body portion 5 which is elongated and of rectangular shape including substantially parallel opposite side edges 6 and 7. The front and back portions of the body portion 5 are substantially smooth. The extreme lower end portion 8 comprises one of the parts of a clamping means whereby the holder is clamped or attached to a license plate or the like. This lower portion is provided from one side to the other of the holder with an outwardly extending rib 9 and the opposite portion of this rib is in the form of a groove 10. Substantially medially of the opposite sides 6 and 7 of the holder and adjacent the rib 9, there is an opening 11 for a purpose later described. Slightly above this opening, the main body portion 5 of the holder is provided adjacent opposite sides thereof with substantially arcuately shaped emblem or the like holding and embracing ears 12 and 13. These ears 12 and 13 constitute a set and, it will be noted, have opposed arcuate shaped edges 14 and 15 respectively and are stamped from the body 5. The outer edges 16 and 17 of the ears, as will be seen from Fig. 1, are in alignment with the side edges 6 and 7 respectively of the main body portion 5 of the holder. However, these ears are spaced outwardly from the face of the holder 5, as seen in Fig. 2.

The upper end 18 of the holder is in the form of a substantially right-angularly disposed rearwardly extending flange that extends across the whole width of the body of the holder and intermediate the opposite ends of this flange there is an opening 19. The upper part of the holder which is detachable from the main body portion is, as will be seen, of the same width as the body portion and has a substantially rectangularly shaped face portion 20 and the lower part of the same is in the form of a substantially right-angularly rearwardly extending flange 21, which flange substantially intermediate its side edges has an opening 22 therein. The flanges 18 and 21 are complemental in size and shape. The extreme upper end portion 23 of the top bracket part 20 is provided with spaced similarly formed down-turned emblem clamping ears 24 and 25 constituting a set and which ears 24 and 25 are in substantially vertical alignment with the arcuately shaped ears 12 and 13 respectively.

The lower portion 8 of the body 5 of the emblem holder attachment, as recited, constitutes one part of a clamping means for clamping the holder, as a whole, to a license plate or the like. The remainder of this clamping means is a substantially rectangularly shaped clamping plate 26, the upper edge of which 27 is at an obtuse angle with respect to the substantially flat portion 28 and the lower edge 29 of which is also at an angle with respect to the plate clamping plate portion 28. 27 and 29 are in effect outwardly extending flanges but are inclined relative to the flat portion 28 of the clamping member 26. This clamping member 26 is of substantially the same width as the width of the complemental clamping part 8 that is integral with the lower part of the main body portion 5 of the holder. There is an opening 30 substantially intermediate the opposite side edges of the clamping plate 26.

The emblem denoted at E may be of circular disc-like form, as shown, or this emblem or the like may be of oval outline or rectangular or polygonal in outline.

It will be seen that when the emblem E is combined with the holder attachment, that opposite lower portions 31 and 32 and aligned similar upper portions 33 and 34 rest in and are clamped respectively by means of the arcuate set of ears 12 and 13 and the ears 24 and 25 and this emblem is maintained in its proper visual position on the holder by means of the aforesaid sets of clamping ears and the fact that a threaded bolt 35 is passed through registered openings 19 and 22 in the flanges 18 and 21 respectively and the upper part 20 of the holder is thus securely held on the body portion with the flanges 18 and 21 in substantially abutting relationship and maintained in this condition by the bolt 35 and lock washer 36 and nut 37, see Fig. 2. The bolt, as aforesaid, passes through the registered openings 19 and 22 and is maintained in these openings in the flanges 18 and 21 by means of the bolt 35 and nut 37 with the lock washer to prevent loosening of the nut.

With the emblem E thus associated with the holder as immediately described above, there remains the simple expedient of attaching or securing the holder to the license plate L. This attaching is accomplished very readily by placing the transversely extending rib 9 at the lower portion of the holder in a corresponding groove G that is conventional in automobile license plates. Then the clamping plate 26 is positioned so that the inclined flange 29 thereof engages the rib R which is on the face of the license plate and then the simple bolt 38 is passed through openings 11 and 30 that are in registry and the lock washer 39 and nut 40 are applied to the screw-threaded bolt 38 and the clamping plate is drawn tightly against the license plate at the inclined bottom portion 29 thereof, and the flange 27 at the top thereof has its edge 41 firmly in engagement with the face portion of the holder 5 slightly above the opening 11 and below the sets of arcuate ears 12 and 13.

The arcuate edges 14 and 15 of the ears 12 and 13 respectively are rather sharp and they effect a firm biting engagement with the opposite lower portions 31 and 32 of the emblem while the clamping ears 24 and 25 at the top of the holder are firmly brought down on opposite top portions of the emblem by the tightening of the bolt 35 which is in the registered openings 19 and 22 by means of the nut and are held in this association and thus prevent turning or twisting of the emblem relative to the holder or vice versa.

The diameter of certain emblems such as the one indicated at E is such that the similarly formed flanges 18 and 21, when the emblem is clamped in the holder, are in contacting relationship. However, it will be seen that if an emblem of greater diameter than that illustrated herein is to be clamped in the holder, then the flanges 18 and 21 might be out of contacting relationship with each other but yet the bolt and nut which passes through the registered openings in these flanges would serve to properly hold the emblem in a fixed position. By this expedient, different sizes and diameters of emblems and different shapes or outlines of emblems can all be readily secured and properly positioned in and maintained in proper position in the holder.

I prefer to fabricate the entire holder from steel and provide the same with a cadmium finish. However, any other rigid materials may be utilized. It is understood that the complete holder is fabricated from a very rigid, non-flexible, metal or similar material.

What is claimed is:

1. An emblem holder comprising a substantially rigid rectangularly shaped body portion, the upper end of which is provided with a right-angularly rearwardly extending flange, spaced horizontally aligned arcuately shaped clamping ears extending outwardly from the face portion of the holder adjacent the bottom thereof, a part of a clamping means integral with a bottom part of the holder and adapted to cooperate with a detachable and separate part to form full clamping means, an auxiliary body portion also of substantially rectangular formation and having at its lower end a rearwardly extending substantially right-angularly disposed flange similar in size and shape to the flange on the main portion of the holder, the auxiliary portion having an upper edge thereof with integral downwardly extending spaced horizontally aligned clamping ears, which clamping ears are in substantial vertical alignment with the arcuate clamping ears on the main body portion of the holder, each of the said flanges having an opening therein substantially medially of the outer edges thereof and which openings are in registry so that a bolt and nut may be employed to secure the flanges of the auxiliary and main body portions of the holder together, and the said ears being adapted to firmly clamp an emblem therebetween and prevent turning or twisting of the emblem relative to the holder.

2. An emblem or the like holder adapted for attachment to an automobile license plate of substantially rectangular outline and the face portion of which is substantially flat, spaced clamping ears adjacent the bottom portion of the holder and which ears extend outwardly from the face thereof and are in horizontal alignment, a set of spaced horizontally aligned ears integral with the top portion of the holder and which ears are in substantially vertical alignment with the first mentioned ears, the lower portion of the holder having a transversely extending rib thereacross and with the extreme lower portion thereof constituting a part of a means for clamping the holder to a license plate, a separate clamping plate having upper and lower inclined flanges, and the said rib being adapted to rest in a portion of a groove in a conventional license plate on one side thereof while the said clamping plate is adapted to have its lower inclined edge portion thereof contact a rib opposite the groove of the license plate and the upper flange of the said clamping plate adapted to have its edge engaging a transversely extending portion across the face of the holder, and means for securing the clamping plate in its clamped position relative to a license plate.

3. An emblem holder as defined in and by claim 2 wherein the sets of ears are within the opposite edges of the holder.

FRANCIS A. McDERMOTT.

References Cited in the file of this patent

UNITED STATES PATENTS

| Number | Name | Date |
|---|---|---|
| 1,360,405 | Hough | Nov. 30, 1920 |
| 1,777,884 | Horix | Oct. 7, 1930 |
| 1,852,375 | Read | Apr. 5, 1932 |
| 2,166,994 | Hogle | July 25, 1939 |